United States Patent [19]

Clark et al.

[11] Patent Number: 4,580,592
[45] Date of Patent: Apr. 8, 1986

[54] FLOAT CONTROLLED SEPARATOR VALVE

[76] Inventors: Stephen E. Clark, 1344 Monterey Ave.; Earl A. Clark, 1143 Manchester Ave., both of Norfolk, Va. 23508

[21] Appl. No.: 545,352

[22] Filed: Oct. 25, 1983

[51] Int. Cl.³ .............................................. F16K 13/20
[52] U.S. Cl. ................................... 137/172; 137/190; 137/404
[58] Field of Search ...................... 137/172, 190, 404

[56] References Cited

U.S. PATENT DOCUMENTS

| | | | |
|---|---|---|---|
| 787,365 | 8/1905 | Franey | 137/172 X |
| 1,191,342 | 7/1916 | Pendleton | 137/190 |
| 1,995,742 | 3/1935 | Linnmann | 137/172 X |
| 2,170,247 | 8/1939 | Lambert | 137/172 X |
| 2,673,648 | 3/1954 | Kenney | 137/172 UX |
| 2,996,073 | 8/1961 | Wolsh | 137/172 X |
| 3,889,706 | 6/1975 | Wallin | 137/172 |

FOREIGN PATENT DOCUMENTS 59112   8/1911   Austria ................................ 137/404

*Primary Examiner*—Alan Cohan

[57] ABSTRACT

Open vessel separator valve has ballasted, hollow-cavitied float disposed above oil/water inlet orifice. Float having large net mass floats in water and sinks in oil. Liquid passes through spillways of sinking float into said float cavity and fills same. Sunken float applies downward force upon sealing means thereunder, thereby closing oil/water inlet orifice. Device can be reset by draining liquid from sunken float.

11 Claims, 7 Drawing Figures

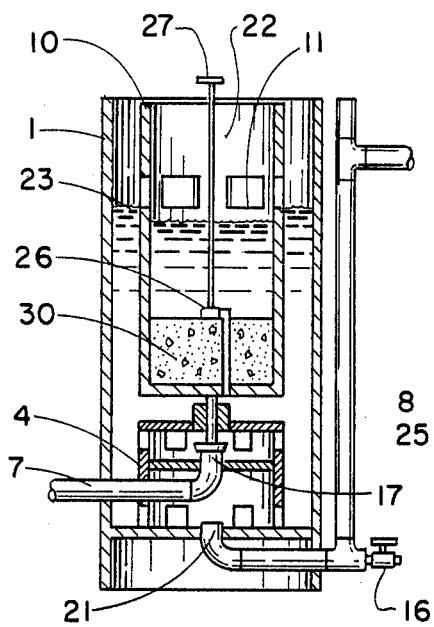
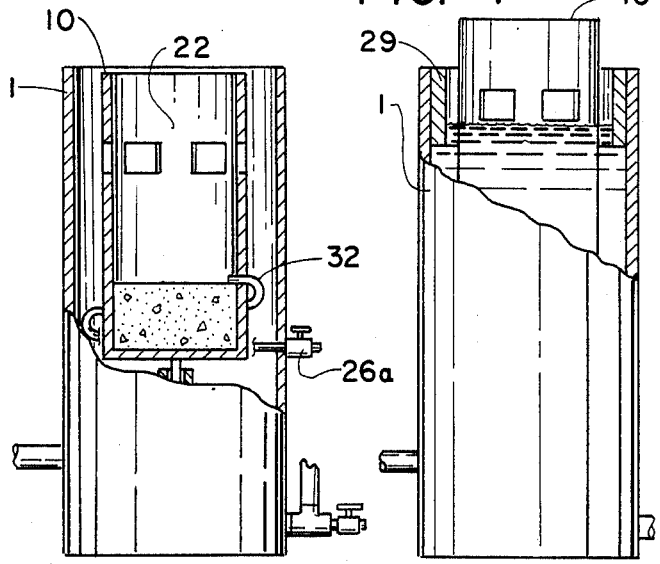
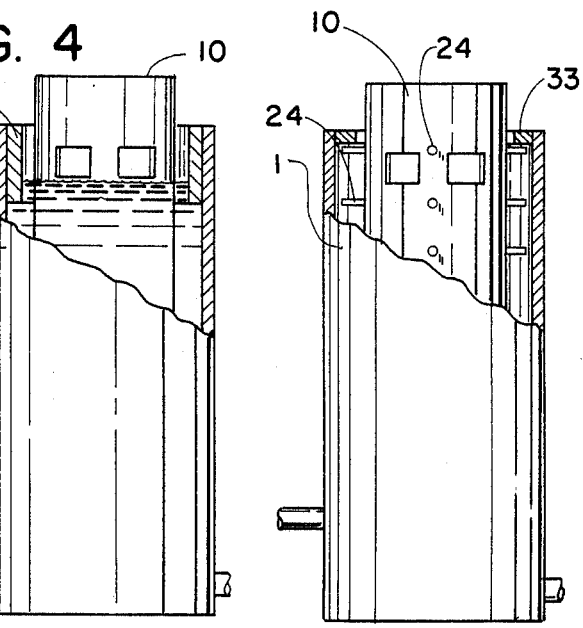
FIG. 4
FIG. 5  FIG. 6  FIG. 7

FLOAT CONTROLLED SEPARATOR VALVE

FIELD OF INVENTION

The present invention relates to a float controlled valve for separating a liquid, such as water, from at least one other liquid, such as oil, having a lower density than the first mentioned liquid. In particular, the present invention relates to a float controlled valve by which means water may be discharged from a liquid storage tank and by which means discharge of oil is prohibited.

BACKGROUND

Although the present invention has application in the prevention of discharges and accidental mixing of many liquids, for simplicity, its application in the prevention of oil discharges will be described.

As is generally known, most oils are immiscible with water and, due to the lower density of the former, tend to rise to the surface of the water.

When storing large quantities of oil, it is often the case that small quantities of water condense or otherwise settle out of the oil, thereby forming a water table at the bottom of the container in which the liquids are stored. It is often desirable to remove such water tables. In order to draw water from the bottom of oil storage tanks, water draw-off pipelines are often located at or near the bottom of such tanks. Such pipelines are provided with either manual or automatic closing valves by which means discharge may be stopped when oil becomes present in the line.

Many such automatic closing valves are known. The most common types of these valves generally comprise a vessel having an inlet, an outlet and a specific gravity sensitive float that is less dense than water but more dense than oil. Typically in such valves, the float floats freely within the vessel when the vessel is filled with water. The float sinks when the vessel is substantially filled with oil, thereby closing the outlet and stopping further liquid discharge from the device.

A problem of such devices is that the height at which the outlet closing float floats within the vessel is proportional to the ratio of oil to water within the vessel. Therefore, in such devices if oil slowly enters into the vessel the float will slowly sink, and accordingly will slowly shut off discharge.

Another problem of such devices is that as the oil/water level slowly lowers within the vessel the float will reach a neutral buoyancy within the liquid. As such, the weight (downward force) of the float becomes nearly zero. If any obstruction (twig, hair, etc.) should become located underneath such a float, the downward force may not be sufficient to overcome the obstruction and the device would malfunction.

Similarly, if even a small object were to come to rest on top of such a float, it may be sufficient to sink it, prematurely closing the discharge outlet.

Another problem of such devices is that when the oil/water level in the vessel is at a height which positions the float within close proximity to the discharge outlet, high velocity flow between the float and discharge may effect a venturi flow situation and thereby cause the float to sink prematurely and at high speed.

Another problem of such devices is that a large quantity of oil must be present inside the vessel in order to cause the float to close the discharge outlet.

Another problem of such devices in which flow is controlled by closing the outlet is that inlet and outlet fluid pressures and flow rates must be closely regulated so that flow rate out of the device not be greater than flow rate into the device. When such is not the case, the water level in the device lowers, which causes the float to lower and close off the device—even if there is no oil present. For the same reason, cutting off the flow of liquid into such devices will cause the device to close. In most cases, valves of this type once closed will not reopen by simply refilling the vessel with water.

It is a further problem of such devices that in the presence of oil, only flow out of the device is stopped and flow from storage tank may only be controlled if said vessel is a "closed" container.

It is a further problem of such devices that they must be closely examined to determine whether or not valve has actuated (closed) and whether or not oil is present within the device.

It is a further problem of such devices that, in many cases, a long multiple sequence operation is required in order to "reset" the devices once they have been closed.

It is a further problem of such devices in which only flow from the device is controlled, that in the event of equipment failure (for example, a leak in the vessel), flow from the storage tank will not be stopped.

OBJECTS

Accordingly, it is an object of the present invention to provide a float controlled valve for separating two liquids of different specific gravities, particularly oil and water, in which the speed at which the valve closes is independent of the rate of ingress of the lighter fluid.

It is another object of the present invention to provide a device of the character described in which closure of said float is not inhibited by small suspended contaminants floating thereunder.

It is another object of the present invention to provide a device of the character described in which float cannot be prematurely closed by the settling of water suspended debris upon the top of said float.

It is another object of the present invention to provide a device of the character described in which float cannot be prematurely closed by high discharge flow rates from the device.

It is another object of the present invention to provide a device of the character described in which the valve may be actuated (closed) by the presence of only a small quantity of oil in the device.

It is another object of the present invention to provide a device of the character described in which flow rate out of the device may temporarily be greater than flow rate into the device.

It is another object of the present invention to provide a device of the character described in which it is easily discernible whether or not there is oil present in the device, and whether valve is open or closed.

It is another object of the present invention to provide a device of the character described in which the device may be reset for operation with a simple, manual resetting operation.

It is another object of the present invention to provide a device of the character described in which flow into the device will be stopped in the event of minor structural leaks or other malfunctions in the device.

These and further objects and advantages of the present invention will become better understood by those skilled in the art by reference to the drawings and ensuing description thereof.

DRAWINGS

FIG. 4 is a vertical cross-sectional view of the present invention showing closed inlet orifice;

FIG. 5 is a perspective view of the present invention showing an alternate float drain construction;

FIG. 6 is a perspective view of the present invention showing vessel collar construction;

FIG. 7 is a perspective view of the present invention showing float guide and float restrainer construction.

DESCRIPTION

Figure 1:
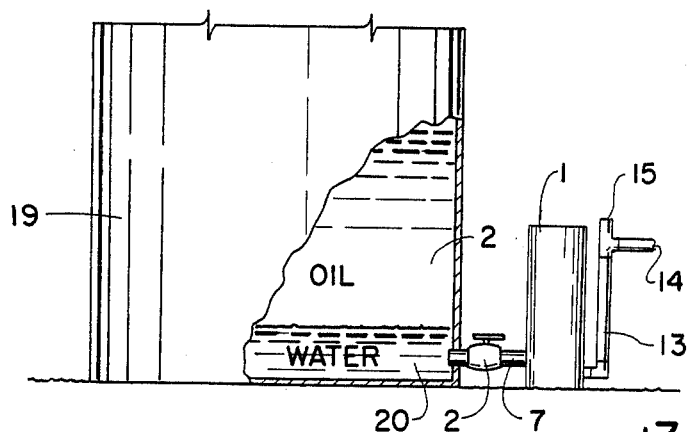
FIG. 1 is a perspective view showing the present invention connected to an oil/water storage tank.

FIG. 1 shows the present invention connected by liquid inlet conduit (7) to an oil/water storage tank (19). Tank valve (2) may be used to control liquid flow from tank (19) to the invention.

Figure 2:
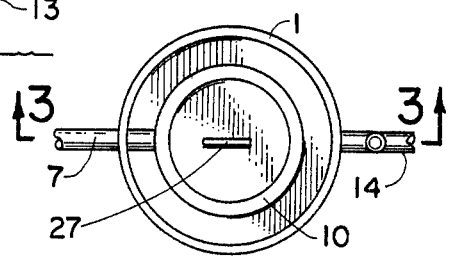
FIG. 2 is a plan view of the present invention.

Referring to FIG. 2, the present invention comprises a vessel (1) having side wall(s) and bottom which are impermeable to liquids. Diffuser housing (4) is located within vessel (1) and is mounted upon vessel bottom. Diffuser housing (4) is divided by separator plate (31) into upper and lower chambers, called diffuser (5) and discharge (6) chambers respectively. Diffuser housing (4) is provided with a plurality of openings (18) by which means fluid within vessel (1) may flow into or out of said housing. Fluid inlet conduit (7) passes through vessel wall, into diffuser chamber (5) and terminates therein with one end (17) of conduit opening upwardly. An axially slideable plunger (8) is located directly above said conduit opening (17) and inside of plunger guide (9) which is secured to top of diffuser housing (4). Orifice seal (29) is secured to the bottom of plunger (8) and is used to close inlet conduit orifice (17). Float (10) is located within vessel (1) and is generally situated above plunger (8). One or more spillways (11) are located in the side of float (10) through which fluid may enter float cavity (22). Discharge conduit (12) passes through vessel bottom and terminates within discharge chamber (6) at discharge orifice (21). Discharge conduit riser (13) is connected to discharge conduit (12). Fluid outlet (14) is located near top of discharge conduit riser (13). Vent (15) is located in discharge conduit and opens to atmosphere. Vessel drain valve (16) is located at low point of discharge conduit (12).

Float drain valve (26) located at bottom of float (10) is used to drain liquids from float (10) and may be opened or closed by extension handle (27). Ballast material (30) is disposed within the bottom of float (10).

OPERATION

Referring to FIG. 1:

One end of a liquid inlet conduit (7) terminates in, and may be opened by tank valve (2) to the bottom of an oil and water storage container (19). Water (20), being immiscible in, and more dense than, oil (28), tends to collect at the bottom of storage tank (19).

Figure 3:
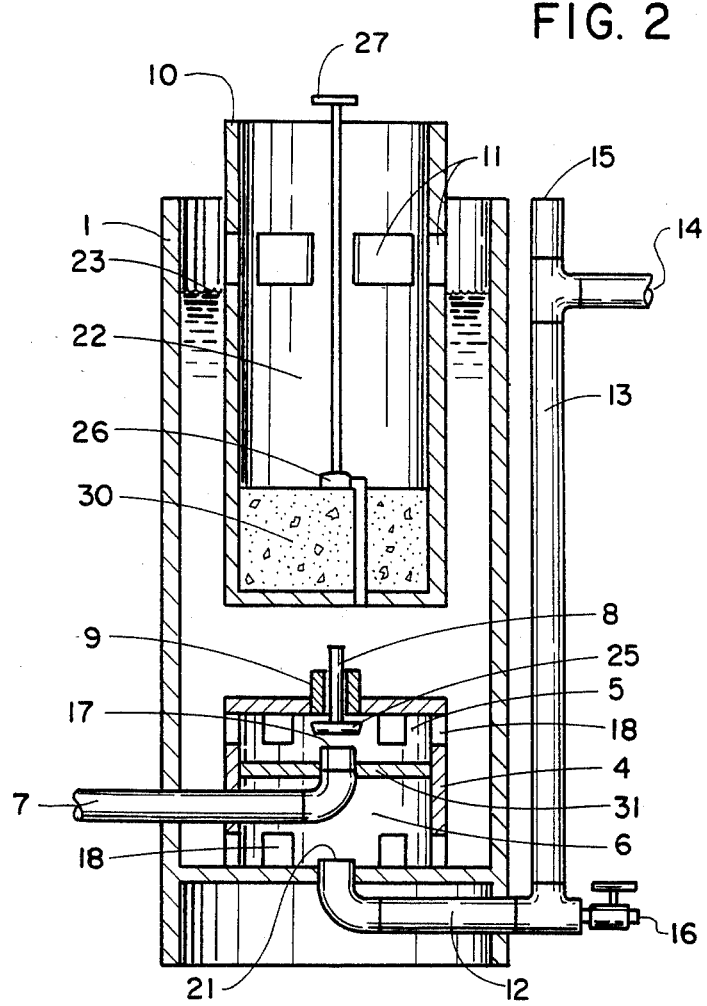
FIG. 3 is a vertical cross-sectional view of the present invention taken along the line 3—3 showing opened inlet orifice.

Referring to FIG. 3:

Water from storage tank flows, by gravity, through liquid inlet conduit (7) into diffuser chamber (5). Water passes through inlet conduit orifice (17), into diffuser housing (4), through diffuser housing openings (18) and fills up vessel (1) and discharge conduit (12), one end of which penetrates through and opens into bottom of vessel, until water level within vessel and discharge conduit riser (13) both reach elevation of fluid outlet (14). As water continues to enter vessel (1) via inlet conduit (7), it flows from vessel through discharge orifice (21) located in the bottom of discharge chamber (6), into discharge conduit (12) and subsequently through fluid outlet (14) from which point the water is discharged from the device.

Float (10) is of large mass and is provided with float cavity (22) sufficient in volume to reduce the gross density of the float to below that of water, thereby allowing it to float in water. Spillways (18) are located in the wall of float (10) such that the bottom of spillways (18) are slightly above water surface (23) when float (10) is floating in water.

When oil begins to pass through conduit (7), the water already located within the vessel (1) will continue to flow out of the device through discharge conduit (12). Oil entering diffuser chamber (6) from inlet conduit (7), flows through diffuser housing openings (18) into vessel (1) where, being less dense in water, the oil will rise to the surface (23).

As liquid flows into diffuser chamber (5), it is initially directed toward the underside of orifice seal (25). As the liquid deflects off of seal it has a continuous self-cleaning effect which helps keep debris (which may be suspended in the liquid) from settling on seal and hindering its effectiveness.

As oil continues to enter vessel (1), it collects in a layer at the liquid surface (23). Water in the vessel, being more dense than oil, will be displaced toward the bottom of the vessel (1), from which point it will continue to flow into discharge conduit (12) and out of device.

As oil layer at surface (23) thickens as a result of incoming oil, the specific gravity of the combination of oil and water surrounding the float is reduced, and float (10) will begin to sink. When the float (10) sinks to the point where the level of liquid within vessel (1) is slightly above the lower edge of spillways (11), liquid present in vessel will flow through spillways into float cavity (22). The added weight of the liquid inside of float cavity (22) will cause float (10) to sink further, allowing even more liquid to flow through spillways into float cavity. In this manner the float cavity quickly becomes filled, or nearly filled, with liquid and sinks within vessel (1), landing upon plunger (8) as shown in FIG. 4. The weight of float (10) landing on plunger (8) pushes against shaft causing orifice seal (25) to press against inlet conduit orifice (17) and thereby stopping liquid flow into device.

It is noted that the device must be designed so that the downward force of the orifice seal (25) against inlet conduit orifice (17) is sufficient to overcome hydraulic force against underside of plunger closure seal that is exerted by liquid within inlet conduit (7).

The downward force with which the float (10) acts upon plunger (8) is approximately equal to the weight liquid which spills into float cavity (22) during the sinking of the float. Minus the weight of liquid displaced by any portion of float cavity which remains empty ( i.e. buoyant forces) after float has settled upon plunger shaft (24). In order to maximize these downward forces, in the preferred embodiment of the invention float (10) is provided with a high density ballast such as concrete or lead (30) and walls of float (10) are made relatively thin. This construction maximizes volume (and weight) of liquid which may be displaced by the floating float. An additional method of maximizing the downward forces is provided by selecting the distance between position of bottom of float in its floating mode to position of bottom of sunken float after settling upon plunger is large enough to allow quantity of liquid spilling into float cavity (22) to completely fill said cavity. This may be effected by adjusting the height of discharge outlet above said plunger which serves to establish height of surface of liquid within vessel (1). Completely filling float cavity with liquid serves to increase net downward force of sunken float by increasing weight of liquid inside cavity and by eliminating buoyant forces of empty cavity. Ballast (30) further serves to keep float (10) floating in a generally upright orientation.

It will be appreciated that the weight of float may be selected so as to provide sufficient downward force while sinking to overcome small debris, such as twigs or mud, which may be present within vessel and which may offer mild restraining forces against the sinking of said float.

It is also demonstrated that only a small quantity of oil is required inside of vessel (1) in order for the float to begin the sink; and once spillways sink below level of liquid the speed at which the float sinks is rapid and is generally independent of rate at which oil and water are entering or leaving the device.

The sensitivity of the float (i.e. the quantity of oil necessary to cause the float to sink), is determined by the thickness of the oil layer in which the float is floating; and, therefore, only indirectly by the volume of oil present in the vessel. The volume of oil necessary to provide a given oil layer thickness is determined by the distance between the outside of the float (10) and the inside of the vessel (1). The sensitivity of the float can be increased by reducing this distance. In applications where high sensitivity is preferred, a collar (29) may be inserted near the top of vessel (1) as shown in FIG. 6 which effectively reduces the inside diameter of the vessel (1).

In the preferred embodiment of the invention diffuser housing (4) is divided into upper and lower (diffuser and discharge, respectively) chambers, which are physically separated from each other by a separator plate (31). Separator plate (31) serves to direct incoming liquids away from discharge conduit orifice (21). By so doing, liquids entering vessel are diffused initially throughout the vessel rather than setting up natural flow currents directly out of inlet orifice (17) and into discharge orifice (21), which would have the disfunctional effect of permitting adequate opportunity for oil that may be entering vessel to rise to the surface.

In the preferred embodiment of the invention float guides (24) as shown in FIG. 7 are provided to insure that float (10) remains in a generally upright orientation and that it remains centered above plunger (8).

Once inlet orifice (17) has been closed in the manner described above, further flow into the device is stopped until device has been manually reset. Two methods of resetting the device are presently described. Referring to FIGS. 1 and 4, tank valve (2) is manually closed thereby cutting off liquid supply to the device. Discharge conduit valve (16) may then be opened, allowing liquid within vessel (1) and discharge conduit (21) to drain from device. Float valve (26) is opened, allowing liquid within float cavity (22) to flow into vessel (1) and subsequently out of the device through discharge conduit valve (16). Float valve (26), located in the bottom of float may be of any of a number of standard valve configurations and may be opened or closed using any of a nunber of different configurations of standard valve actuators, including extension handle (27).

Once float (10) and vessel (1) have been drained empty, float valve (26) and discharge conduit drain valve (16) are closed. Tank valve (2) may then be opened causing flow into vessel to recommence. Where hydraulic pressure within inlet conduit (7) is too low to force plunger (8) and float (10) clear of inlet orifice (17), float may be manually lifted clear of plunger to allow liquid to enter vessel. Float (10) may be provided with handles (not shown) to facilitate lifting it clear of plunger (8).

Referring to FIG. 5:

An alternative construction of the present invention comprises a flexible conduit (32) having one end of which terminates within float cavity (22) and the other end penetrating vessel wall and terminating at float drain valve (26a). Float drain valve (26a) is normally closed when device is in operation. In order to reset this alternative construction of the present invention for operation once inlet orifice has been closed in the manner described above, tank valve (2) is closed to stop supply of liquid to the device. Float drain valve (26a) is opened, allowing liquid within float cavity to be drained to outside of device. When liquid within float cavity (22) is empty of liquids it will refloat in the liquid that still remains within vessel (1). Float drain valve (26a) is then closed. Device is now reset for operation and tank valve (2) may be reopened to supply liquid to the device.

In the preferred embodiment of the invention, the top of vessel (1) is open thereby allowing for visual inspection for presence of oil in vessel as well as access to float (10) for maintenance.

Float (10) preferrably extends above the top of vessel (1) when said float is floating, and drops below top of vessel when float has sunken, thereby allowing visual determination of whether the valve is open or closed from a distance.

In the preferred embodiment of the invention, float restrainer (33) is attached to inside wall of vessel (1) to restrict the height to which float (10) may float. In the event that flow entering vessel (1) is greater than the rate at which is is being discharged, liquid level within vessel and float (10) will rise. If liquid level continues to rise in vessel after upward movement of float (10) has been stopped by float restrainer (33), liquid will spill into float and will cause device to close in the manner described above.

It will be appreciated that, since float (10) is submersed in liquid only when it has sunken, small debris introduced to vessel through inlet orifice (17) has no opportunity to come to rest on top of float (10) and thereby cause it to sink prematurely.

It will also be appreciated by those skilled in the art that in the event that a leak occurs in wall of vessel (1), liquid within vessel will drain therefrom causing water level to lower, causing float to lower upon plunger (8). thereby closing inlet orifice (17). Such a sequence provides the device with limited failsafe protection against uncontrolled loss of oil.

While the above description contains specificities, these should not be construed as limitations on the scope of the invention, but rather as an examplification of one preferred embodiment thereof. Many variations are possible, for example: plunger type valve described above may be replaced by one of several known valve closure means; float (10) may be provided with orifice sealing means (25) by which it may directly close inlet orifice (17); flow directions tubes or baffles may be provided within vessel (1) to divert incoming liquid away from discharge orifice (21). Accordingly, the scope of the invention should be determined not by the embodiment illustrated, but by the appended claims and their legal equivalents.

We claim:

1. A flow control device for allowing the discharge therefrom of the heavier of two liquids and for preventing the discharge therefrom of the lighter of said two liquids comprised of:

a vessel;
   said vessel being a container having an opening in the top of said container;
   a liquid inlet conduit penetrating wall of said vessel, having an orifice at one terminal end of said conduit positioned within said vessel and aimed vertically upward; the opposite end of said inlet conduit being provided with means whereby said conduit may be attached to liquid supply;
   a liquid outlet conduit penetrating wall of said vessel, the opposite ends of said outlet conduit having an orifice located inside and outside of said vessel, respectively;
   one of said liquid outlet conduit orifices being located within the bottom of said vessel; an intermediate section of said liquid outlet conduit being at an elevation below that of top of said vessel and above that of said inlet conduit orifice; and one of said liquid outlet conduit orifices being located exterior to said vessel and at an elevation below top of said vessel;
   a float disposed within said vessel positioned above said inlet conduit orifice; said float having a net mass density greater than that of each of said two liquids;
   a hollow cavity within the interior of said float being of volume large enough to reduce the gross mass density of said float and said cavity to less than density of the heavier of said two liquids;
   an opening at the top of said cavity extending out of said float by which means liquid may flow into said float; and
   an orifice sealing member disposed between bottom of said float and said inlet conduit orifice by which means said inlet conduit orifice is closed when weight of said float acts downward against said member.

2. The device as described in claim 1 in which said liquid inlet conduit orifice positioned within said vessel is located above said outlet conduit orifice positioned within said vessel.

3. The device as described in claim 2, in which physical barrier is disposed within said vessel by which means maximum upward travel of said float may be restricted.

4. The device as described in claim 1 in which said float is vertically elongated and is ballasted such that most of the weight of said float is concentrated in the bottom half of same;
   and said opening at top of said cavity extends out of upper half of said float.

5. The device as described in claim 1 further comprising a housing disposed inside of, and at the bottom of, said vessel;
   said housing being divided into upper and lower chambers;
   one or more openings from the inside to the outside of each of said upper and lower chambers;
   said liquid inlet conduit orifice positioned within said vessel being disposed within said upper chamber of said housing; and
   said liquid outlet conduit orifice positioned within said vessel being disposed within said lower chamber of said housing.

6. The device as described in claim 1 in which said orifice sealing member is attached to bottom of said float.

7. The device as described in claim 1 in which valve is disposed within said outlet conduit by which means liquids may be drained from said conduit.

8. The device as described in claim 1 in which valve is disposed within said float by which means liquid within said cavity may be drained therefrom into said vessel.

9. The device as described in claim 1 comprising an appendage to said float extending above said vessel by which means the elevation of said float may be determined.

10. The device as described in claim 1 in which the inside of said vessel is relatively more narrow adjacent to said float and relatively more wide below said float.

11. The device as described in claim 1 comprising a float restricting means whereby the upward vertical movement of said float is physically limited.

* * * * *